(12) United States Patent
Royz et al.

(10) Patent No.: US 8,162,283 B1
(45) Date of Patent: Apr. 24, 2012

(54) STAND FOR SUPPORTING A PORTABLE ELECTRONIC DEVICE

(75) Inventors: Miraslav Royz, Ottawa (CA); Pavel Royz, Ottawa (CA); Robert G. Dickie, King City (CA)

(73) Assignee: Miraslav Royz, Ottawa, Ontario (CA)

( * ) Notice: Subject to any disclaimer, the term of this patent is extended or adjusted under 35 U.S.C. 154(b) by 0 days.

(21) Appl. No.: 12/913,960

(22) Filed: Oct. 28, 2010

(51) Int. Cl.
*A47G 1/24* (2006.01)

(52) U.S. Cl. ............................................ 248/455

(58) Field of Classification Search .................. 248/455, 248/456, 457, 460, 461, 309.1, 676, 454, 248/328; 361/679.01
See application file for complete search history.

(56) References Cited

U.S. PATENT DOCUMENTS

| | | | | |
|---|---|---|---|---|
| 4,044,980 A | * | 8/1977 | Cummins | 248/456 |
| 4,421,943 A | * | 12/1983 | Withjack | 136/246 |
| 6,003,831 A | * | 12/1999 | Coleman | 248/688 |
| 6,196,511 B1 | * | 3/2001 | Beauchemin | 248/328 |
| 7,104,516 B2 | * | 9/2006 | Uto et al. | 248/688 |
| 7,172,167 B2 | * | 2/2007 | Phifer et al. | 248/460 |
| 7,251,131 B2 | | 7/2007 | Shah et al. | |
| 2005/0253040 A1 | * | 11/2005 | Yang | 248/688 |
| 2007/0075208 A1 | * | 4/2007 | Chen | 248/455 |
| 2007/0170335 A1 | * | 7/2007 | Chavollo | 248/322 |
| 2009/0230161 A1 | | 9/2009 | Emsky | |
| 2010/0072334 A1 | | 3/2010 | LeGette et al. | |
| 2010/0171671 A1 | | 7/2010 | Park | |

FOREIGN PATENT DOCUMENTS

GB 2288790 11/1995

* cited by examiner

*Primary Examiner* — Ramon Ramirez
(74) *Attorney, Agent, or Firm* — Sand & Sebolt

(57) ABSTRACT

The present invention is a stand for supporting a portable device at an inclined angle relative to a flat surface. The stand includes a frame that is securable to the device and a support secured to the frame. The support is movable in an aperture in the frame between a collapsed position and an erected position. A first portion of the support extends outwardly beyond an exterior surface of the frame, when in the erected position, and engages the flat surface. A second portion of the support remains parallel to the interior surface of the frame when in both the collapsed and erected positions. A tether is connectable to the frame to suspend the device from a vertical flat surface.

33 Claims, 17 Drawing Sheets

STAND FOR SUPPORTING A PORTABLE ELECTRONIC DEVICE

BACKGROUND OF THE INVENTION

1. Technical Field

This invention relates generally to accessories for electronic devices. More particularly, the invention relates to a stand for portable electronic devices capable of displaying video images. Specifically, the invention relates to a stand that is securable to a portable electronic device and is movable from a collapsed position to an erected position when a video image is to be viewed for an extended period of time. When in the erected position, the stand is able to support the electronic device at an inclined angle relative to a flat surface in either of a portrait mode and a landscape mode.

2. Background Information

The capabilities of portable electronic devices such as cell phones, smart phones and personal digital assistants (PDAs) have been advancing rapidly over the past few years. Many of these devices are able to play videos, music videos and movies on their high definition screens. These devices are also now able to display images in either of a portrait or landscape orientation. However, to watch a video or full feature film, there is no comfortable or convenient way to place or position the portable electronic device for extended viewing other than to lay it flat on a surface.

There is therefore need in the art for an apparatus that will assist a viewer to retain a portable electronic device in a suitable orientation for extended viewing of the screen.

BRIEF SUMMARY OF THE INVENTION

The present invention comprises a stand for supporting a portable device at an inclined angle relative to a flat surface. The stand includes a frame that is securable to the device and a support secured to the frame. The support is movable in an aperture in the frame between a collapsed position and an erected position. A first portion of the support extends outwardly beyond an exterior surface of the frame, when in the erected position, and engages the flat surface. A second portion of the support remains parallel to the interior surface of the frame when in both the collapsed and erected positions. A tether is connectable to the frame to suspend the device from a vertical flat surface.

The portable device in question is a portable electronic device, preferably a handheld device that includes a screen for displaying a video image. The stand is capable of supporting the electronic device on the flat surface such that the screen is in either of a portrait mode and a landscape mode. The stand is moved to a collapsed position for use other than extended viewing of a video image on the screen.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1:
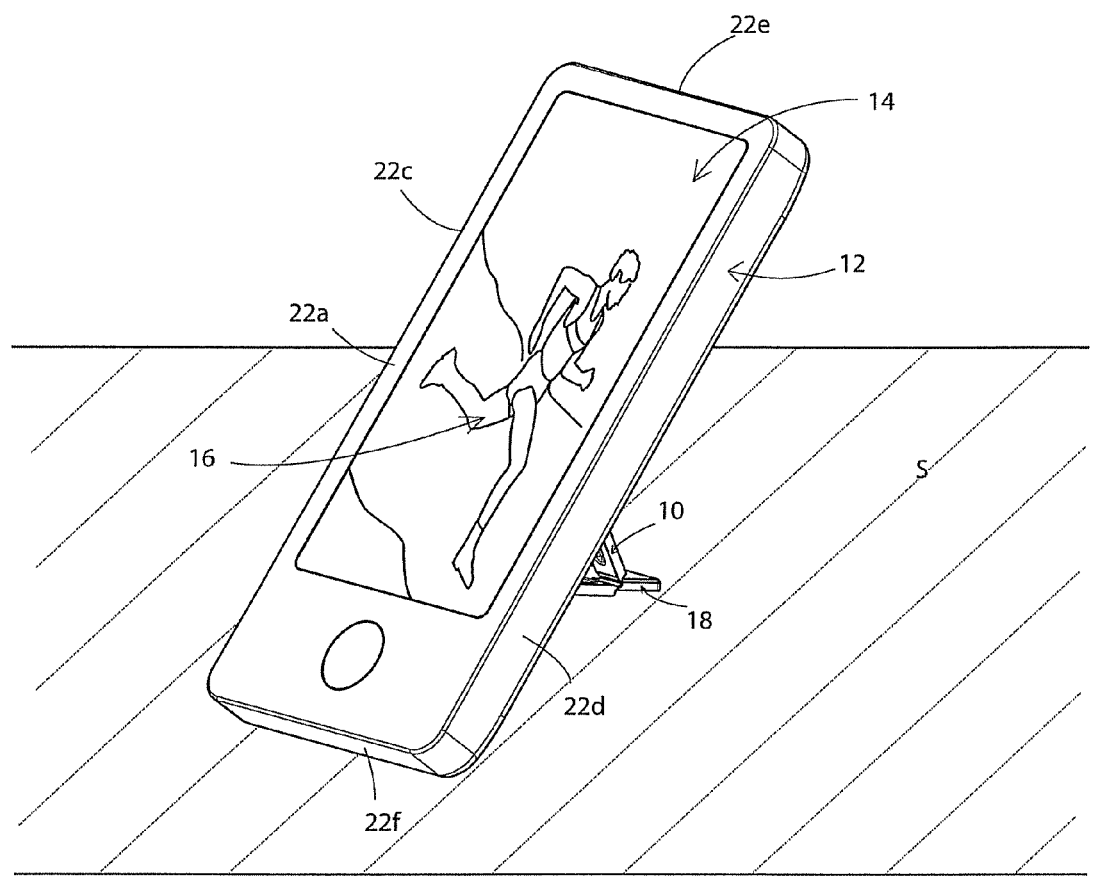
FIG. 1 is a front perspective of the portable electronic device and the stand, showing the stand in the erected position and showing the portable electronic device oriented so that the screen thereof is in a portrait orientation.
Figure 2:
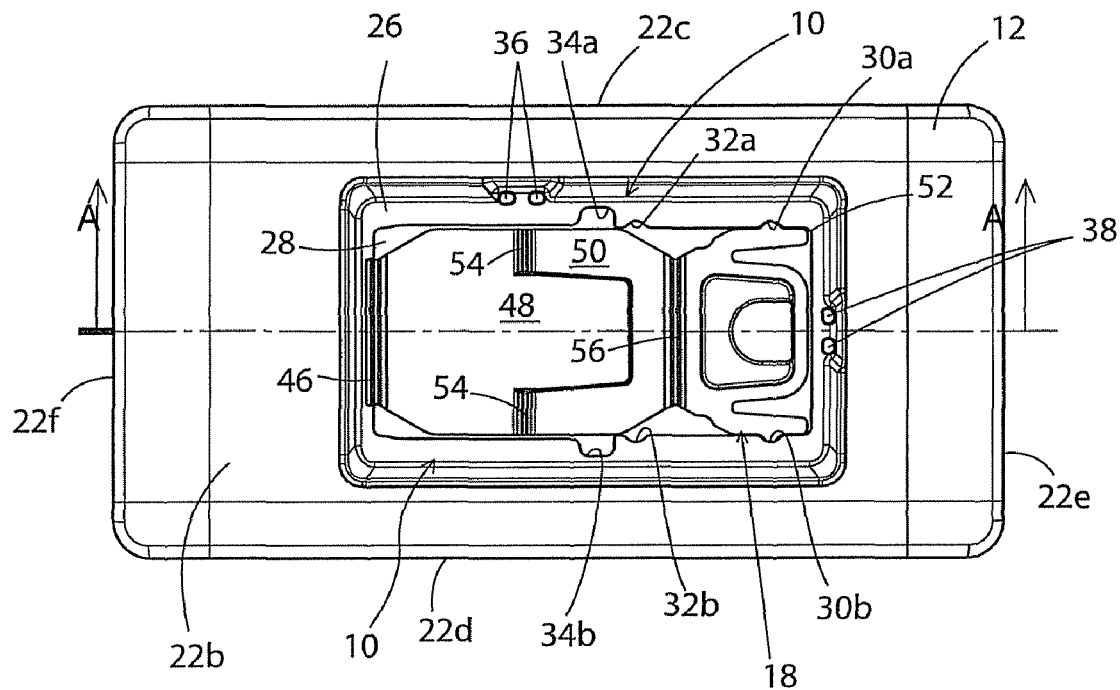
FIG. 2 is a rear view of a stand in accordance with the present invention mounted on a back wall of a portable electronic device where the stand is in a collapsed position.

Referring to FIGS. 1-13 there is shown a stand in accordance with the present invention, generally indicated at 10. Stand 10 preferably is engaged with a portable device, such as a portable electronic device 12. Stand 10 preferably is substantially permanently secured to electronic device 12, but the engagement may, alternatively, be temporary. Portable electronic device 12 preferably is any suitable handheld electronic device that includes a screen 14 and a central processing unit (not shown). Device 12 is capable of displaying an image, such as a video image 16, on screen 14. Such video images 16 potentially are of an extended or protracted nature such that it can become onerous for a user to hold device 12 to watch the entire video image 16 from beginning to end. For example, the video image 16 may be a music video, a film clip, a full-length feature film, a television show, a live stream or a readable electronic book. Normally to watch such a video image 16, the user would hold electronic device 12 in their hand or lay device 12 flat on a horizontal surface "S" and bend over the same to view image 14. Obviously, this hand-held action or viewing the device 12 on a flat surface "S" is tedious and tiresome if video image 16 is of an extended nature.

Stand 10 is useful to retain device 12 in a position where it does not need to be handheld by the user in order to easily and comfortably view screen 14 thereof for a protracted length of time, such as during the viewing of a full length feature film.

As disclosed in FIGS. 1-13, stand 10 includes a movable support 18 and when in an erected position (FIG. 1) is able to retain electronic device 12 at an inclined angle relative to surface "S". This makes it easy and comfortable for the user to see screen 14 and the video images 16 displayed thereon without the user having to hold the device. A suitable angle for such viewing is between 45 and 80 degrees relative to the horizontal. When the device 12 is not being used to view an extended length video image, then the stand is moved to a collapsed position where it is substantially flush against the wall of the device upon which it is mounted.

Figure 17:
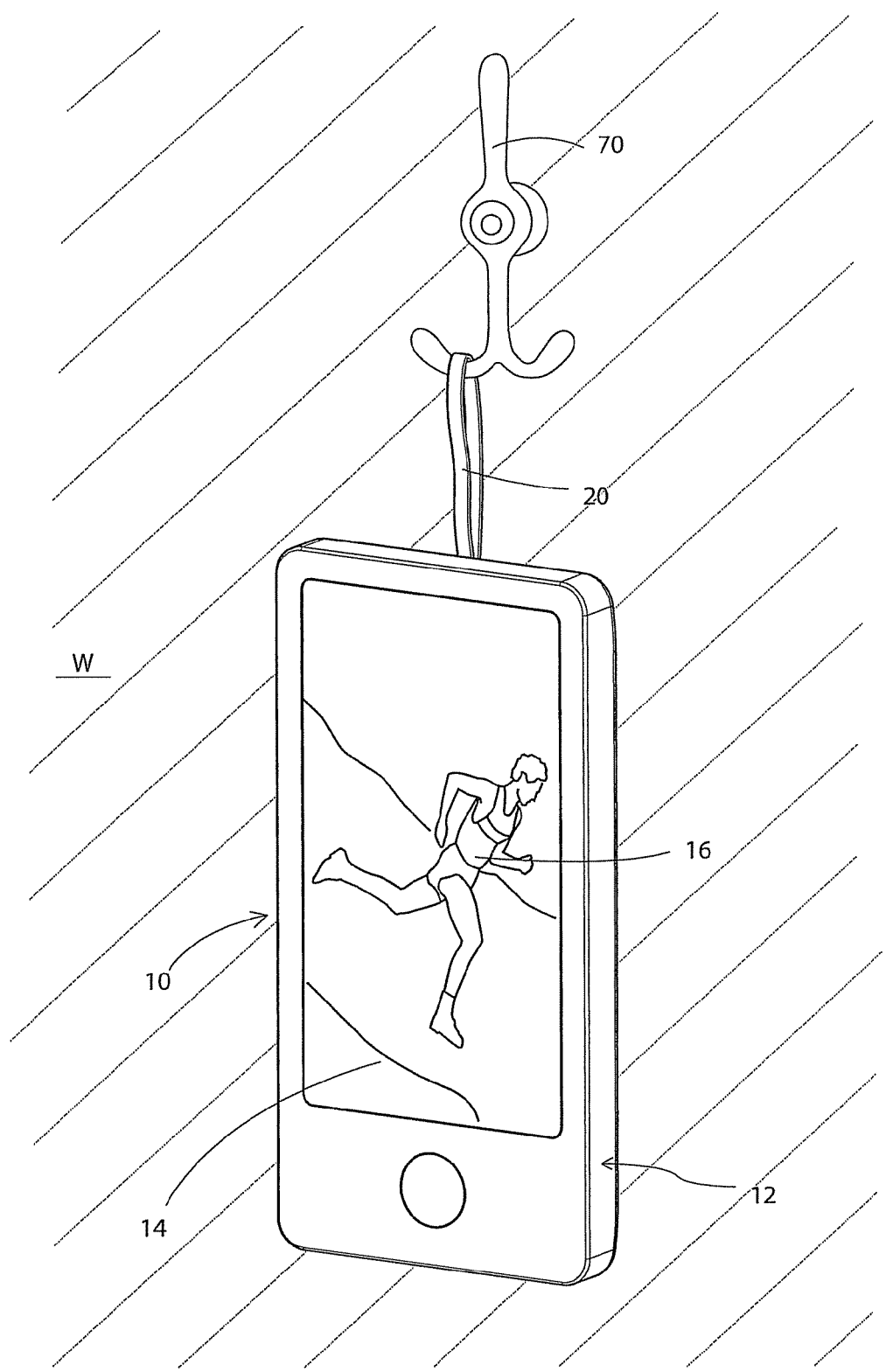
FIG. 17 is a perspective front view of the electronic device hanging by way of the tether from a hook extending out of a wall.

As disclosed in FIGS. 14-17, stand 10 may also be engaged with a tether 20 which makes it possible to suspend electronic device 12 from a vertical flat surface such as a wall "W" (FIG. 17). In this orientation, support 18 preferably is moved to a collapsed position such that device 12 is retained at an angle of 90 degrees relative to the horizontal. Although not illustrated herein, it should be understood that support 18 may also be used in an erected position when device 12 is suspended from wall "W" by tether 20. In this erected position, support 18 will contact wall "W" and retain device 12 at an angle other than 90 degrees relative to wall "W". It will further be understood that using tether 20 with the erected support 18, device 12 may be held against wall "W" in such a manner that screen 14 is angled upwardly or downwardly depending on where tether 20 is engaged on stand 10 as will be described hereinafter.

Figure 3:
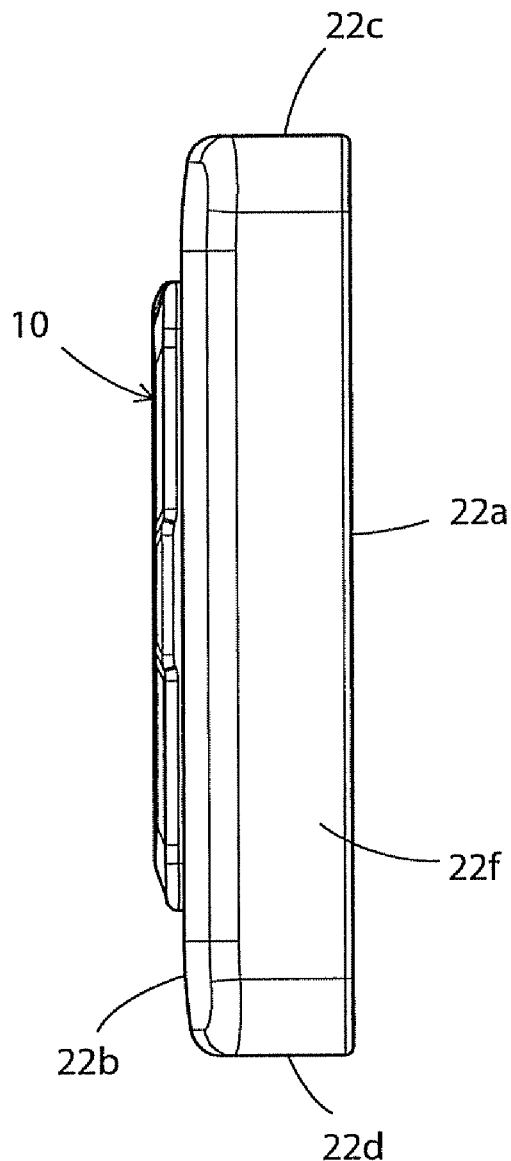
FIG. 3 is a right side view of the stand and portable electronic device of FIG. 2.
Figure 4:
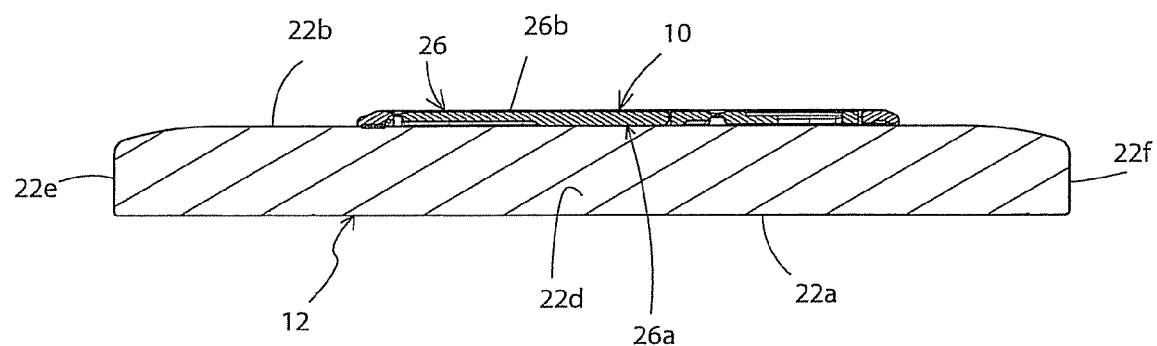
FIG. 4 is a bottom end view of FIG. 2.

Electronic device 12 includes a front wall 22a in which screen 14 is situated, a rear wall 22b (FIG. 2), a first side 22c, a second side 22d, a top end 22e, and a bottom end 22f (FIG. 3 or 4).

In accordance with a specific feature of the present invention, stand 10 is an aftermarket component that is engaged with electronic device 12 either permanently or temporarily. Preferably, the engagement is of a permanent nature in that stand 10 is fixedly secured to electronic device 12 and is not removable therefrom after being so affixed. Preferably, stand 10 is adhesively attached to electronic device 12. Still further, stand 10 preferably is secured to rear wall 22b of electronic device 12 by way of an adhesive. Specifically, a gasket 24 (FIG. 5) having adhesive on both of an interior and exterior surface is used to secure stand 10 to electronic device 12. The interior surface of gasket 24 is placed in abutting contact with a portion of rear wall 22b of electronic device 12 and the exterior surface of gasket 24 is placed in abutting contact with an interior surface 26a (FIG. 4) of stand 10. Preferably, stand 10 is adhesively secured to rear wall 22b in such a position that the battery cover (not shown) of the electronic device is accessible and removable. While it is shown that stand 10 is engaged with rear wall 22b of electronic device 12, it will be understood, that stand 10 may, additionally or instead, include flanges that engage one or more of the sides 22c, 22d, the top and bottom ends 22e, 22f or even front wall 22a of device 12, without departing from the spirit of the present invention.

In accordance with a specific feature of the present invention, stand 10 is made from a single injection molded piece of plastic that is sufficiently flexible enough to allow support 18 to be moved between the collapsed and erected positions (as will be hereinafter described), and yet is still rigid enough to retain device 12 at an inclined angle relative to surface "S" or wall "W". A suitable plastic for the manufacture of stand 10 is polypropylene.

Figure 5:
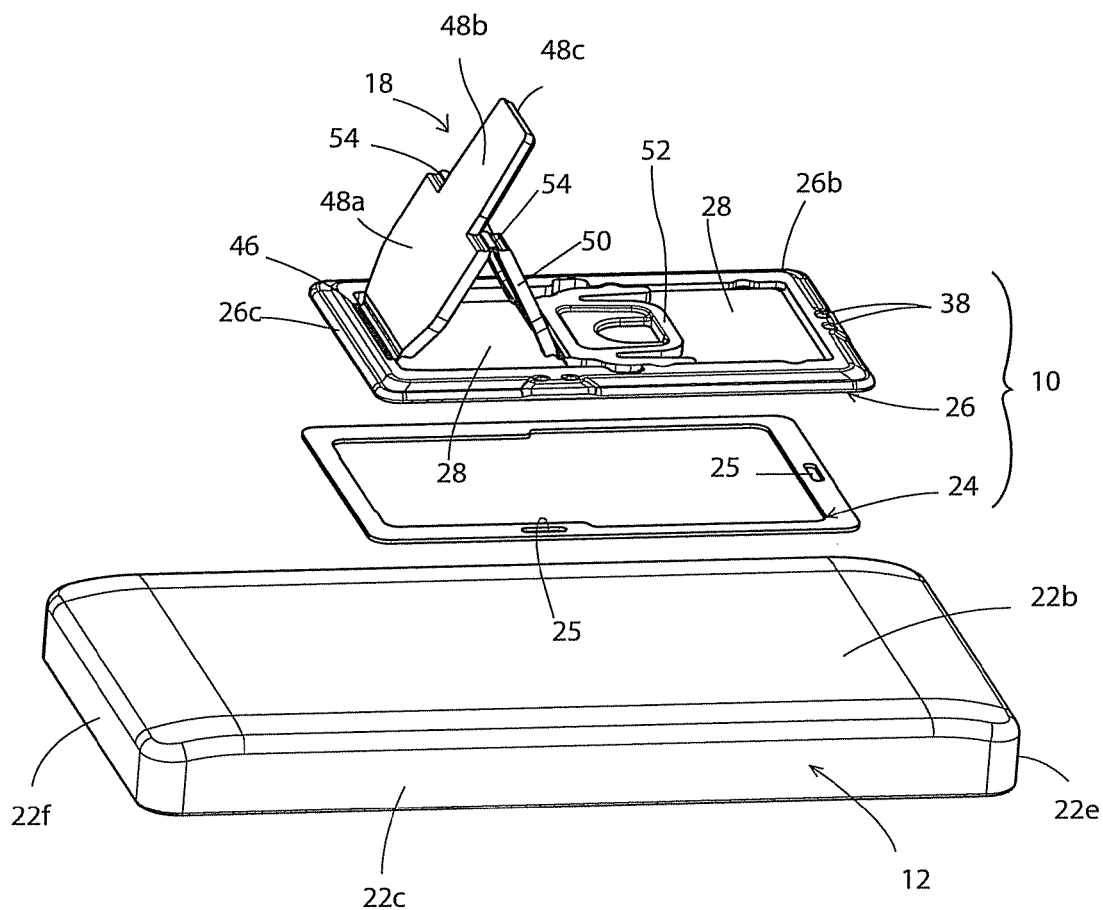
FIG. 5 is an exploded perspective view of the stand, the gasket and the portable electronic device showing the stand in the erected position.
Figure 6:
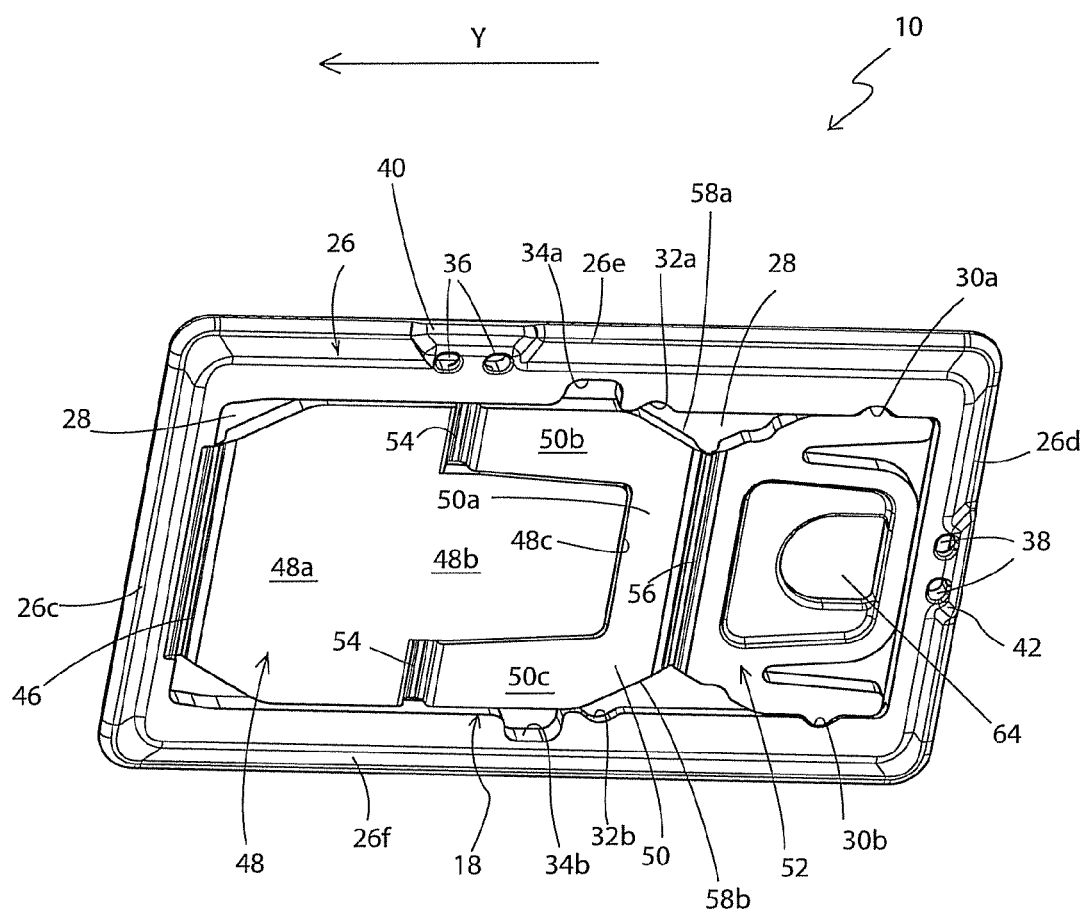
FIG. 6 is a rear view of the stand without the electronic device, showing the exterior surface of the stand when the stand is in a collapsed position.
Figure 7:
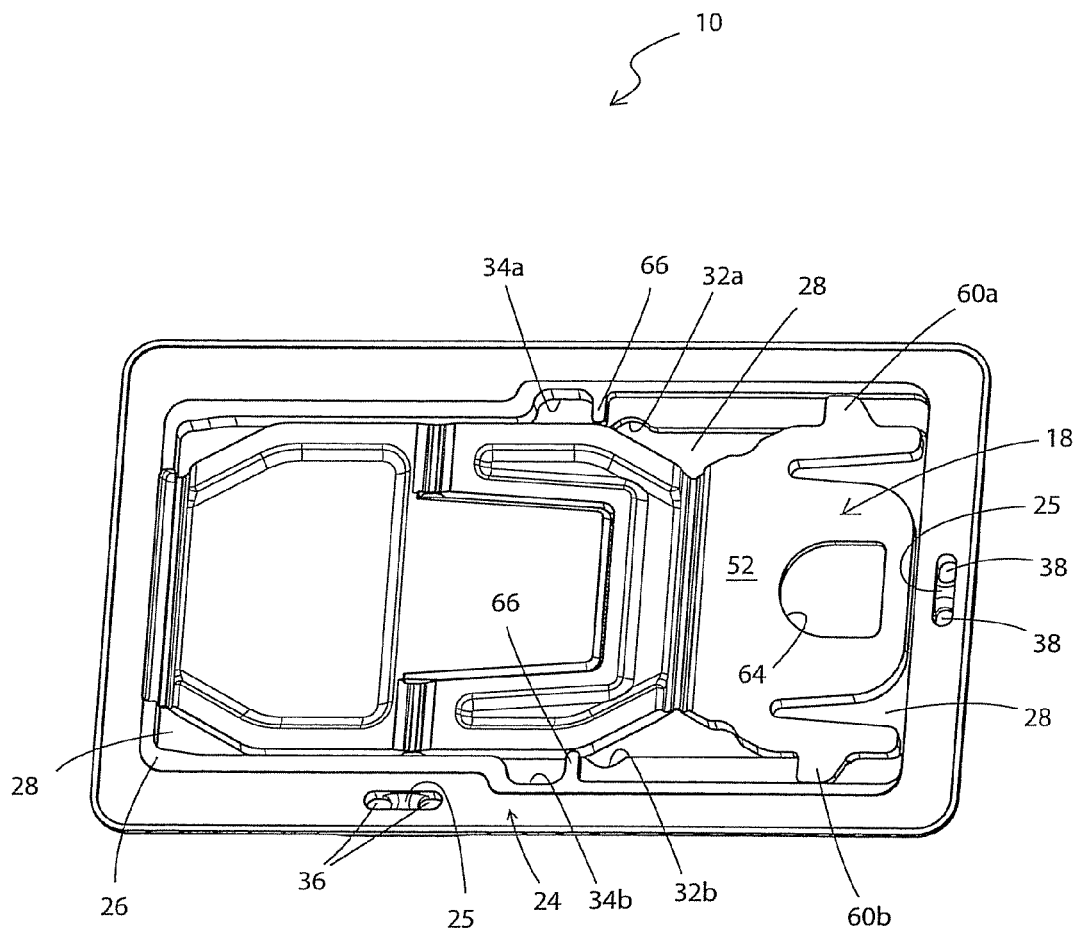
FIG. 7 is front view of the stand without the electronic device, showing the interior surface of the stand which would abut the portable electronic device and showing the stand in the collapsed position.
Figure 9:
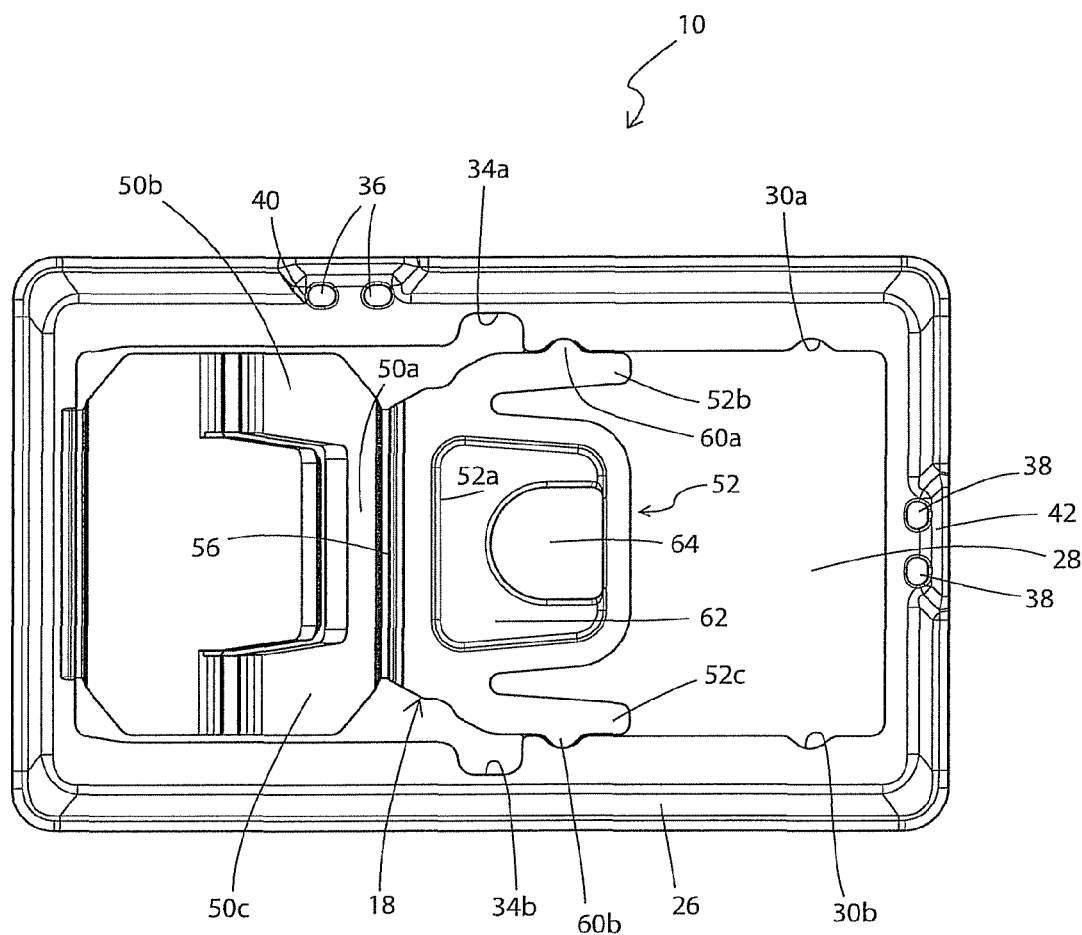
FIG. 9 is a rear view of the stand without the electronic device and showing the exterior surface of the stand when the stand is in the erected position.
Figure 10:
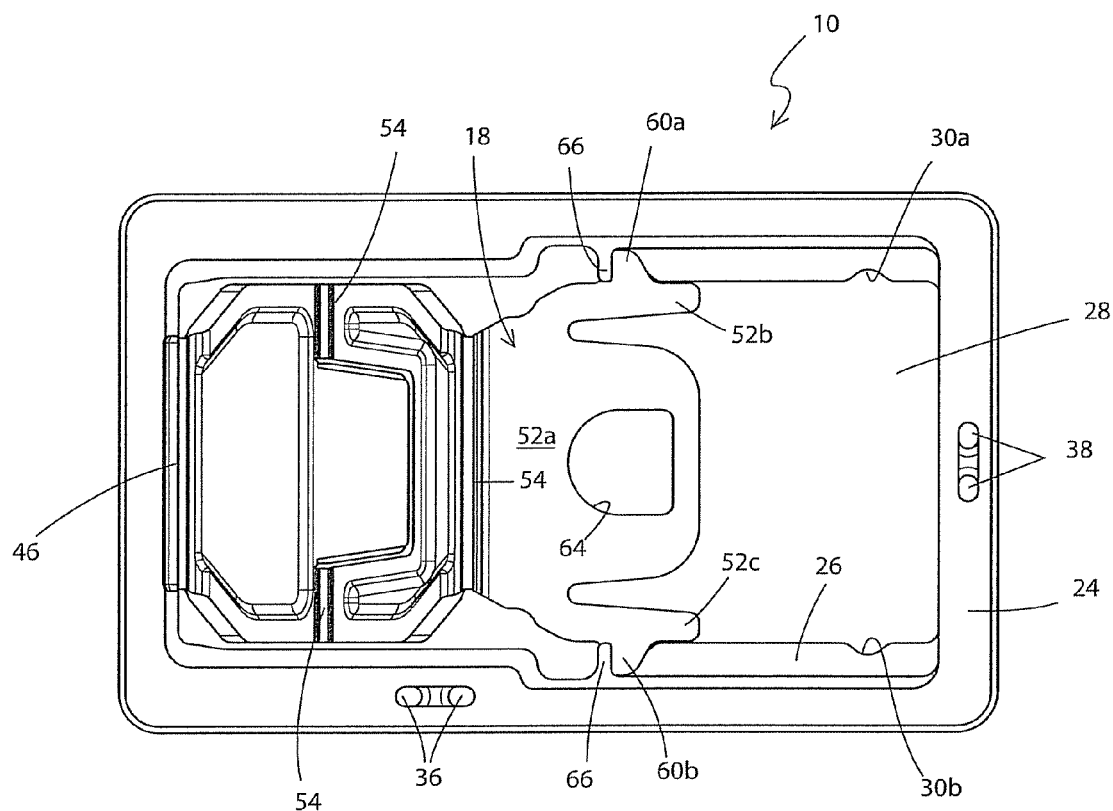
FIG. 10 is a front view of the stand without the electronic device and showing the interior surface of the stand when the stand is in the erected position.
Figure 11:
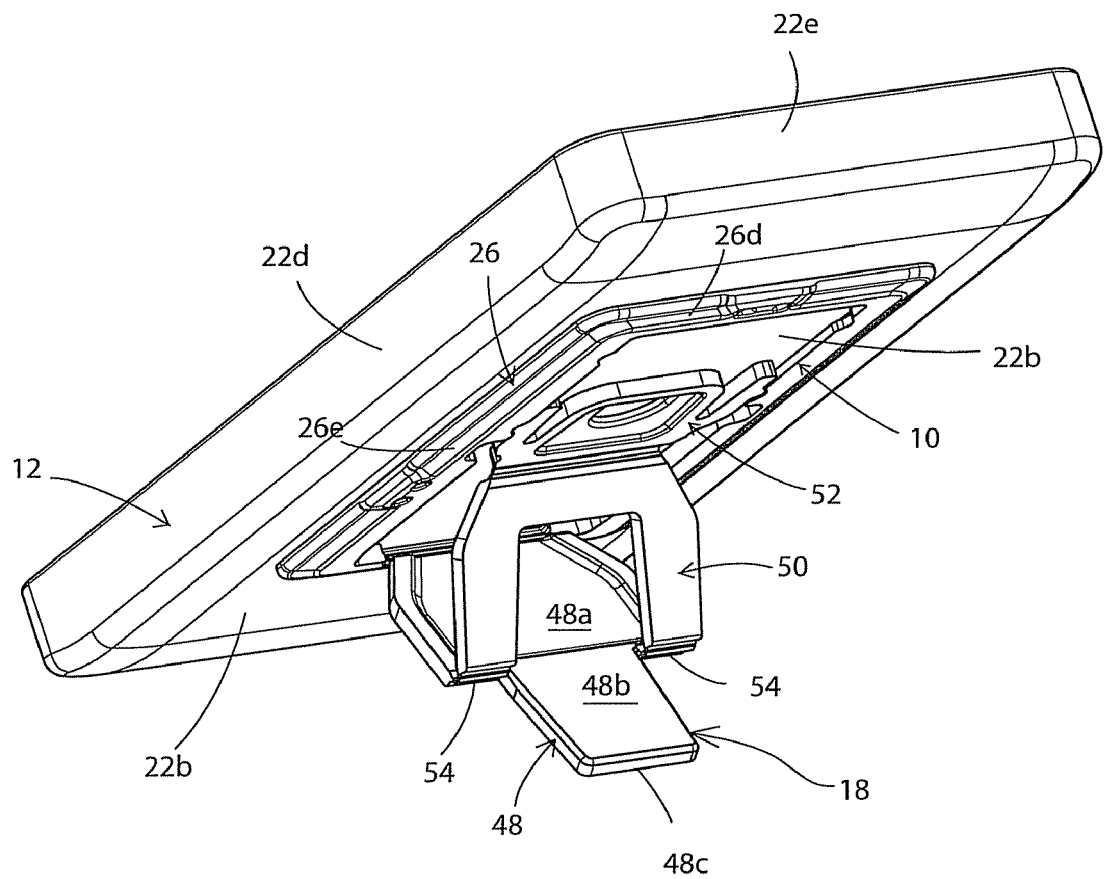
FIG. 11 is a rear perspective view of the portable electronic device with the stand in the erected position.

Stand 10 is shown without electronic device 12 in FIGS. 6 and 7 and is comprised of a generally rectangular frame member 26 and support 18. Frame member 26 has an interior surface 26a (FIG. 4) and an exterior surface 26b (FIG. 5) and includes a first end 26c, a second end 26d, a first side 26e and a second side 26f. Frame member 26 bounds a central aperture 28 (FIG. 9) in which support 18 is disposed. First and second sides 26e, 26f define two pairs of aligned notches that serve as part of a locking mechanism to lock support 18 in one or both of the collapsed position and the erected position. The first pair of aligned notches is identified by the reference characters 30a, 30b (FIG. 9). Each notch 30a, 30b is defined in one of the sides of frame member 26 and adjacent second end 26d. The second pair of aligned notches is identified by the reference characters 32a, 32b (FIG. 7) and these notches are defined in frame member 26 a spaced distance inwardly away from notches 30a, 30b and toward the mid-point of first and second sides 26e, 26f. Frame member 26 further includes a pair of aligned slots 34a, 34b (FIG. 6) defined in first and second sides 26e, 26f a spaced distance inwardly from notches 32a, 32b and closer to the mid-point of first and second sides 26e, 26f. Finally, frame member 26 defines a first pair of aligned holes 36 in one of first and second sides 26e, 26f, and a second pair of aligned holes 38 in one of first and second ends 26c, 26d. (It should be noted that gasket 24 includes a pair of elongate slots 25 (FIGS. 5 & 7) that are positioned to be aligned with each of the pair of holes 36 and 38.) Each pair of aligned holes 36 and 38 is situated in a recessed area 40, 42, respectively, and are configured to engage with connectors 44 (FIG. 14) on tether 20 as will be described hereinafter.

Referring to FIGS. 6 and 7, and in accordance with yet another specific feature of the present invention, support 18 is integrally formed with frame member 26. Stand 10 is die cut in such a manner that support 18 is secured to first end 26c of frame member 26 by a first living hinge 46 and is substantially separated from first and second sides 26e, 26f and second side 26d. Support 18 includes a substantially T-shaped tab 48, a first U-shaped arm 50 and a second generally U-shaped arm 52. First arm 50 is secured to tab 48 by a pair of spaced apart second living hinges 54. First arm 50 is also secured to second arm 52 in a back-to-back configuration by a third living hinge 56.

Figure 8:
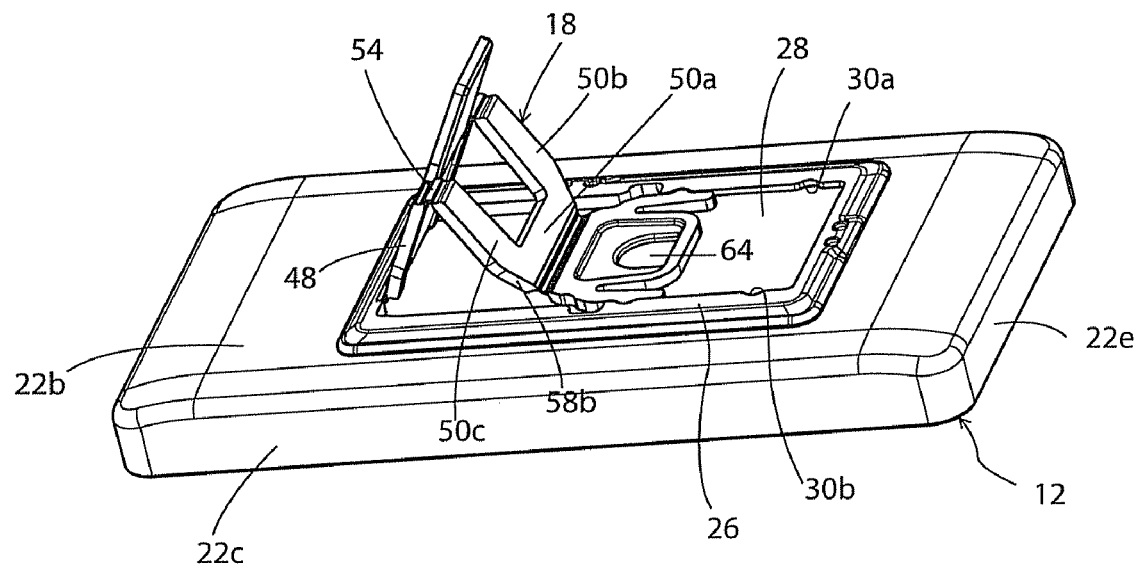
FIG. 8 is a perspective bottom end view of the stand and portable electronic device when the stand is in the erected position.

Referring to FIGS. 5, 6 and 8, tab 48 comprises a base 48a and a leg 48b. Base 48a and leg 48b are coplanar and integrally formed. Leg 48b terminates in a foot region 48c that is adapted to contact surface "S" when stand 10 is used to support electronic device 12 on said surface. Second arm 50 includes a base 50a and a pair of spaced apart parallel legs 50b, 50c. When stand 10 is in the collapsed position, leg 48b nests in the gap between leg 50b and leg 50c. Each leg 50b, 50c includes a tapered corner 58a, 58b adjacent second hinge 56, with the corners 58a, 58b tapering inwardly toward second hinge 56. Referring to FIG. 9, second arm 52 includes a base 52a and a pair of spaced apart spring fingers 52b, 52c. Spring fingers 52b, 52c form part of the locking mechanism for securing the support 18 in one or both of the collapsed and erected positions. Each spring finger 52b, 52c includes a detent 60a, 60b respectively, configured to be selectively engaged in one of the notches of the first and second pairs of notches, i.e., in one of notches 30a, 30b, 32a, and 32b. Detent 60a is selectively receivable in one of notches 30a and 32a, and detent 60b is selectively receivable in one of notches 30b and 32b. The spring-type action of spring fingers 52b, 52c keeps second arm 52 in engagement with frame member 26. Second arm 52 further includes a recessed region 62 and a generally U-shaped aperture 64 configured for receiving a user's fingertip therein. Detents 60a, 60b each include a shoulder region that is configured to engage a stop 66 on frame member 26 so as to limit longitudinal travel of support 18 within aperture 28. Regions of the interior surface of support 18 may be removed or decreased in thickness so as to increase the flexibility of the support 18 and thereby make the same easier to slide back and forth within aperture 28 as will be described further herein.

The stand 10 of the present invention is used in the following manner. As previously indicated, stand 10 is conceived to most likely be an aftermarket part. Consequently, when the user purchases stand 10, he will most likely receive a kit in which stand 10 and gasket 24 are provided. Gasket 24 includes adhesive on both its interior and exterior surfaces and will be provided with a protective strip of material to prevent the same from becoming secured to surfaces unintentionally. When the user wishes to secure stand 10 to electronic device 12, the protective material is removed to expose the adhesive layer on either of the interior and exterior surfaces of gasket 24. Gasket 24 is then engaged with one of interior surface 26a of frame member 26 or onto rear wall 22b of electronic device. A second protective material is removed from the other of the interior and exterior surfaces of gasket 24 and the gasket 24 is then pushed into contact with the other of frame member 26 and electronic device 12. When the user simply wishes to use the electronic device 12 as a handheld device, then stand 10 is left in the collapsed condition, i.e., in the manner illustrated in FIGS. 4, 6 and 7. In this collapsed position, tab 48, first arm 50 and second arm 52 are all coplanar with each other and substantially parallel to the exterior surface 26b of frame member 26 as shown in FIG. 4. Furthermore, detents 60a and 60b are interlockingly received in the aligned notches 30a, 30b. The engagement of detents 60a, 60b and notches 30a, 30b keeps the support 18 in a substantially planar configuration. In this planar configuration, tab 48, first arm 50 and second arm 52 are all substantially parallel with the interior surface 26a of frame 26. Thus, electronic device 12 is suitable to be handheld without components protruding outwardly from a back surface of the device. Additionally, second arm 52 is located in a first position within aperture 28 in that it is disposed proximate second end 26d of frame (FIG. 7).

When it is desired to rest electronic device 12 on surface "S", the user inserts a fingertip into aperture 64 and then pulls second arm 52 toward first end 26c of frame member 26. This movement causes second arm 52 to slide longitudinally within aperture 28 in the direction indicated by the arrow "Y" (FIG. 6). As force is applied to second arm 52 in this manner, detents 60a, 60b disengage from notches 30a, 30b and second arm 52 moves toward first side 26c. The movement causes first arm 50 and tab 48 to rotate upwardly out of alignment with the exterior surface 26b of frame member 26. First arm 50 pivots relative to second arm 52 about third hinge 56. Tab 48 pivots relative to first arm 50 about second hinges 54 and pivots relative to first end 26c of frame member 26 about first hinge 46. The movement of second arm 52 toward first end 26c continues until detents 60a, 60b slide into notches 32a, 32b and simultaneously engage stops 66a, 66b. At this point, second arm 52 is in a second position within aperture 28 in that it is spaced a distance inwardly away from second end 26d (FIG. 9). In this fully erected position (FIG. 8), the tab 48 and first arm 50 are disposed at an angle to each other and form a V-shaped member relative to the exterior surface 26b of frame member 26. Additionally, tab 48 and first arm 50 are disposed at an angle relative to second arm 52. Second arm 52, however, remains substantially aligned with or parallel to the interior surface 26a of frame 26.

Figure 12:
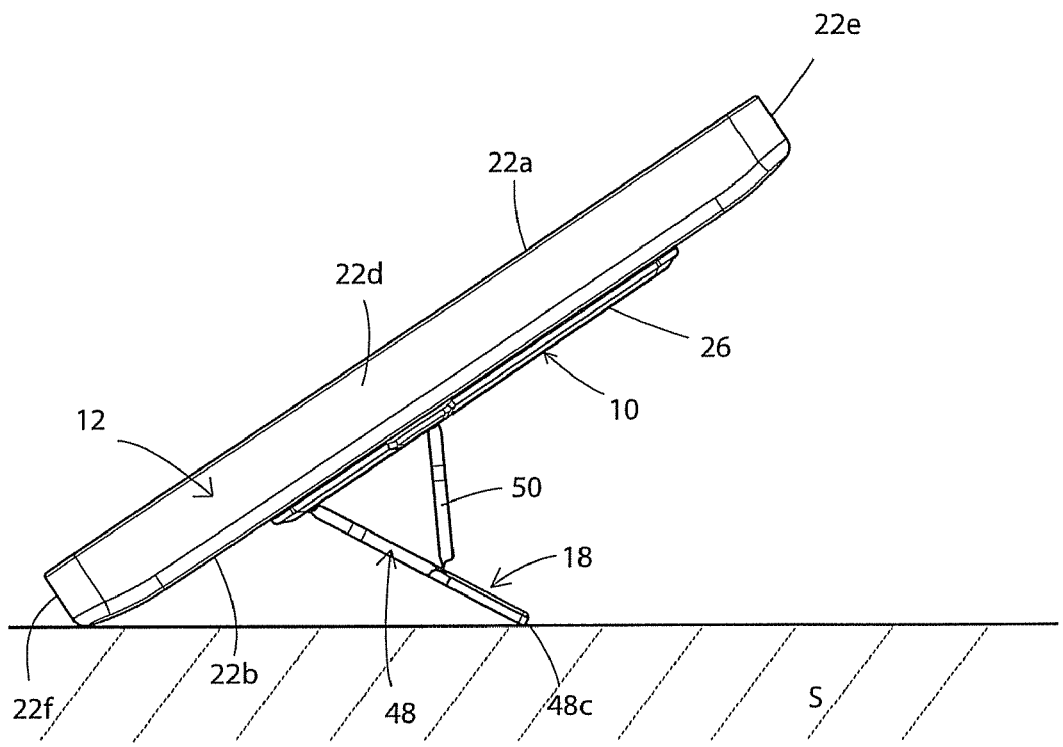
FIG. 12 is a bottom end view of the portable electronic device and the stand as shown in FIG. 11.
Figure 13:
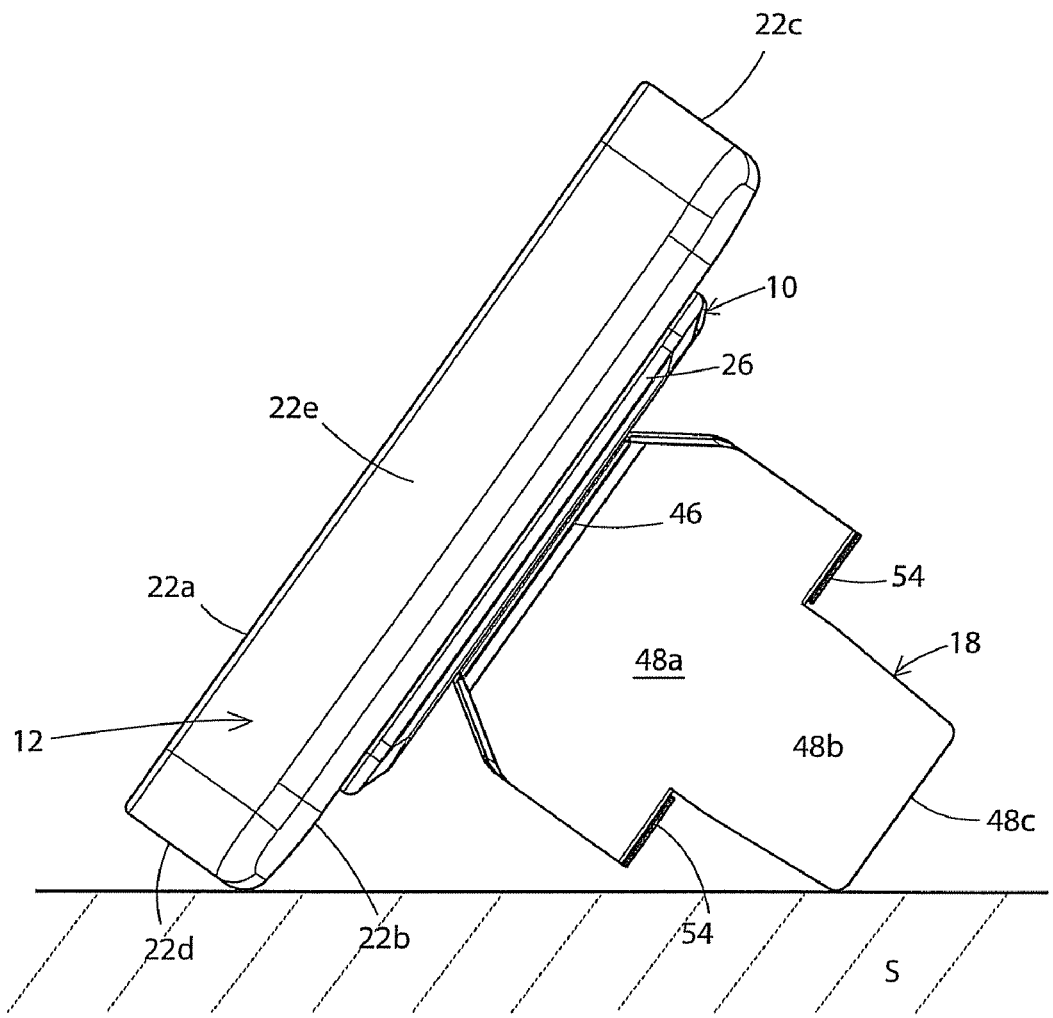
FIG. 13 is a right side view of the portable electronic device and the stand shown with the stand in the erected position and the screen of the electronic device in the landscape orientation.
Figure 14:
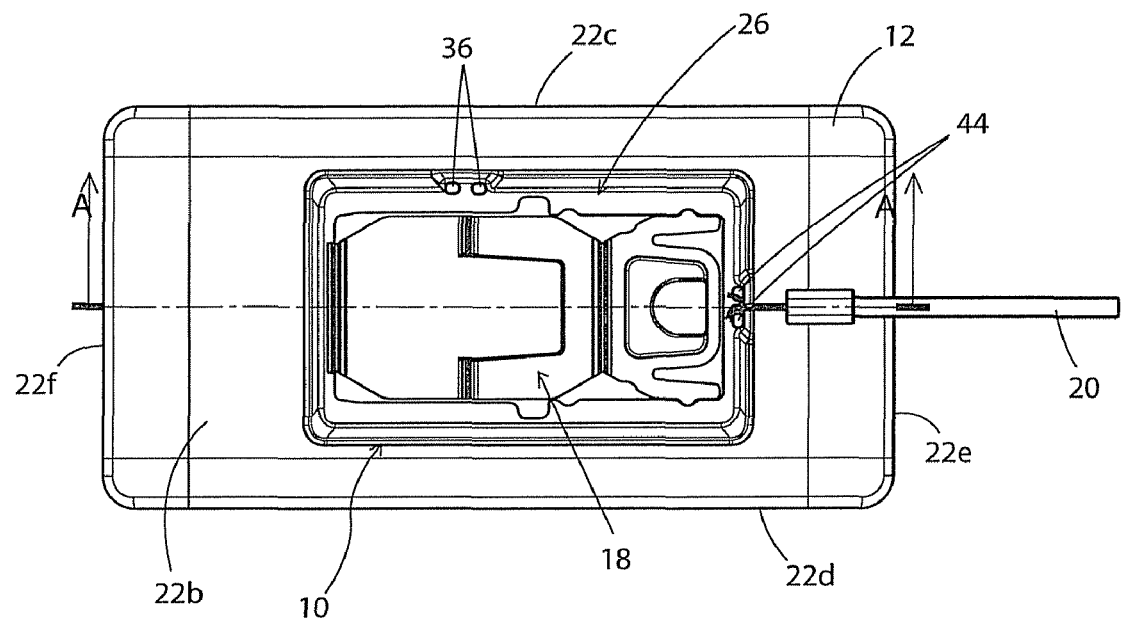
FIG. 14 is a rear view of a stand in accordance with the present invention mounted on a back wall of a portable electronic device where the stand is in a collapsed position and showing a tether engaged in a first position on the stand.
Figure 15:
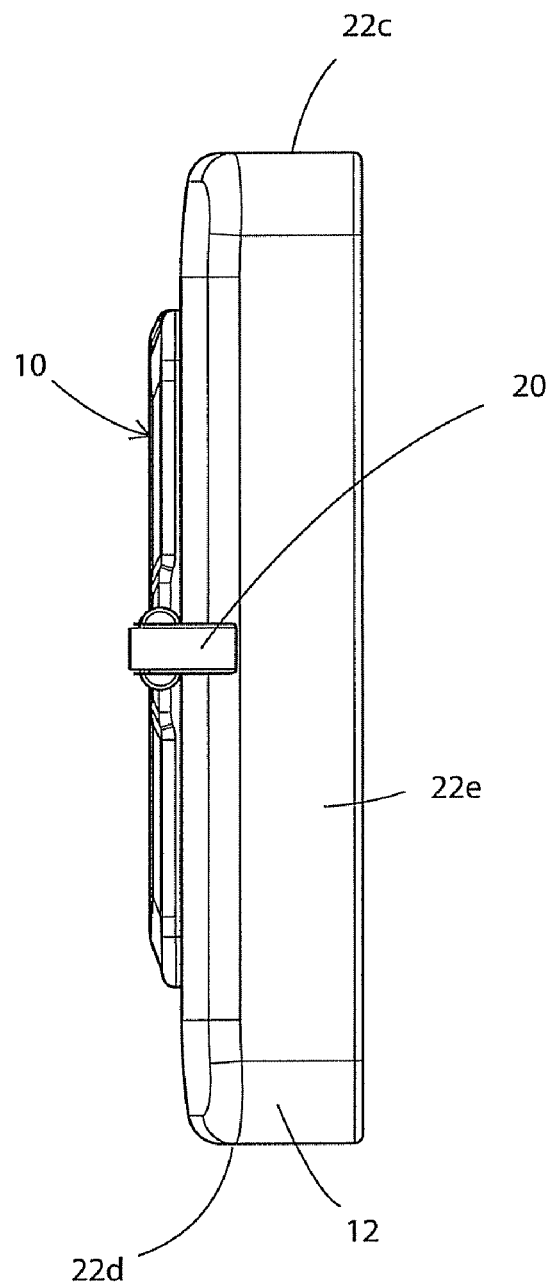
FIG. 15 is a right side view of the stand, portable electronic device and tether of FIG. 14.
Figure 16:
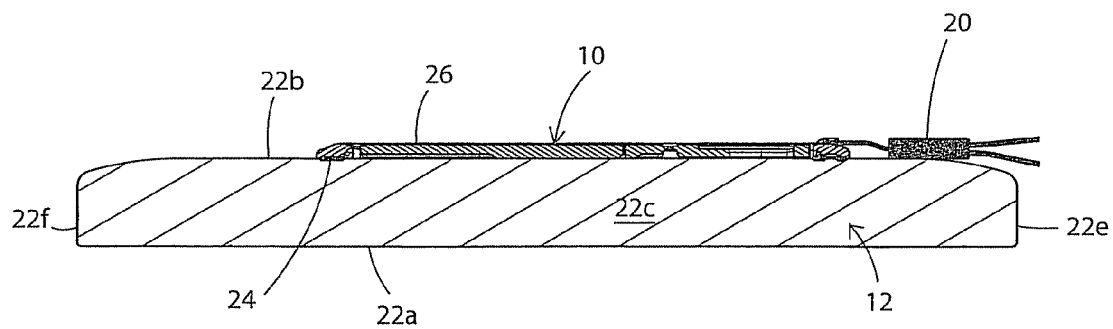
FIG. 16 is a bottom end view of FIG. 14.

At this stage, electronic device 12 can be positioned so that the end 48c of tab 48 and the end wall 22f of device 12 rest upon surface "S" as shown in FIG. 12. In this configuration, screen 14 on electronic device is retained in the portrait orientation (FIG. 1). Alternatively, electronic device 12 can be positioned so that a portion of the end 48c of tab 48 and second side wall 22d rest on surface "S" as shown in FIG. 13. In this configuration, screen 14 on electronic device 12 is retained in the landscape orientation, i.e., at right angles to the portrait orientation. In either of these orientations, the user can operate electronic device 12 so that they can view an extended video image 16 displayed on screen 14.

When it is desired to collapse stand 10, the user inserts a fingertip in aperture 64 and slides second arm 52 toward second end 26d of frame member 26. This longitudinal movement causes detents 60a, 60b to disengage from notches 32a, 32b and second arm 52 slides toward second end 26d until detents 60a, 60b engage once again in notches 30a, 30b. As second arm 52 moves in this manner, both of tab 48 and first arm 50 pivot about first, second and third hinges 46, 54, 56 and move downwardly toward exterior surface 26b of frame member 26. When detents 60a, 60b slide into notches 30a, 30b, tab 48, first arm 50 and second arm 52 are once again coplanar and stand 10 is in its fully collapsed position (FIG. 4).

It should be noted that when stand 10 is in the erected position, the leg portion 48b of tab 48 extends outwardly beyond second hinges 54. This arrangement increases the distance between the surface "S" and the rear wall 22b of electronic device 12. If tab 48 was comprised only of base 48a, then the second hinges 54 would be the region of the stand 10 that would contact surface "S" and the distance between surface "S" and rear wall 22b would be smaller. The greater distance between surface "S" and rear wall 22b enables stand 10 to retain electronic device 12 at an angle greater than 45 degrees relative to surface "S".

FIGS. 14-17 show tether 20 engaged with stand 10. When it is desired to suspend electronic device 12 from a hook 70 (FIG. 17), for example, tether 20 is engaged with one of the aligned sets of holes 36 or holes 38. The user selects which of the sets of holes 36, 38 to use by first determining which orientation of screen 14 they require in order to view video image 16. If the screen orientation required is a landscape orientation, then the pair of holes 36 is selected. If the screen orientation required is a portrait orientation, then the pair of holes 38 is selected. The user inserts the connectors 44 into the selected holes, such as 38 in FIG. 14. The tether 20 is then engaged with hook 70 and electronic device 12 is allowed to hang downwardly therefrom and substantially parallel to the exterior surface of wall "W". In this position, rear wall 22b of electronic device is substantially parallel to wall "W". If it would be easier and more comfortable for the user to view screen 14 at an angle, then the support 18 is moved from the collapsed position to the erect position so that end 48c of tab 48 contacts wall "W" and hold electronic device at an angle relative thereto.

It will be understood that while the locking mechanism is described as comprising a plurality of notches 30a, 30b, 32a, 32b defined in the frame 26 and detents 60a, 60b provided on spring fingers 52a and 52b of support 18, the notches could instead be provided on the support 18 and the detents provided on the frame 26 without departing from the spirit of the present invention.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A stand for supporting a portable device at an inclined angle relative to a flat surface; said stand comprising:
   a frame having an interior surface and an exterior surface; wherein the interior surface is adapted to be secured to a wall of the device; and
   a support secured to the frame; said support being movable between a collapsed position and an erected position, and the support is disposed substantially parallel to the interior surface of the frame when in the collapsed position, and wherein the support includes a first portion and a second portion;
   a first hinge secures a first end of the first portion of the support to the frame;
   a second hinge secures the second portion to the first portion; wherein the first and second portions are in linear alignment with each other within the frame when the support is in the collapsed position; and wherein the first portion of the support is disposed at an angle to the interior surface of the frame and extends outwardly beyond the exterior surface thereof when the support is in the erected position; and wherein the second portion of the support remains parallel to the interior surface when the support is in the erected position, and the first and second hinges are substantially aligned with the frame when the support is in each of the erected and collapsed positions.

2. The stand as defined in claim 1, further comprising:
   an aperture defined in the frame; and wherein the support is disposed within the aperture; and wherein the second portion of the support is disposed in a first location in the aperture when the support is in the collapsed position and is disposed in a second location in the aperture when the support is in the erected position, and the second portion of the support is movable between the first and second locations as the support is moved between the collapsed and erected positions.

3. The stand as defined in claim 1, further comprising a locking mechanism that locks the support to the frame in one or both of the collapsed and erected positions.

4. The stand as defined in claim 1, wherein the frame comprises:
   a first side and a second side disposed parallel to each other and spaced a distance from each other;
   a first end and a second end disposed parallel to each other and spaced a distance from each other, where the first and second ends extend between the first and second sides; whereby the frame is substantially rectangular;
   an aperture defined and bounded by the first and second sides and first and second ends; and wherein the support is disposed within the aperture; and
   a first hinge connects the support to the first end of the frame.

5. The stand as defined in claim 1, wherein the frame defines at least a first hole in a first location, and the stand further includes a tether having a connector that is engageable in the first hole, and wherein the tether is adapted to suspend the frame from a vertical surface when the connector is so engaged.

6. The stand as defined in claim 5, wherein the support is movable between the collapsed and erected positions, and wherein when the tether is used to suspend the frame from the vertical surface and the support is in the erected position, a portion of the support engages the vertical surface and thereby retains the stand at an angle relative thereto.

7. The stand as defined in claim 5, further comprising a second hole defined in the frame at a second location that is at ninety degrees relative to the first location; and wherein the connector on the tether is selectively engageable in one of the first and second holes, and when engaged in the first hole the stand is adapted to retain the device in portrait mode, and when engaged in the second hole the stand is adapted to retain the device in landscape mode.

8. The stand as defined in claim 1, further comprising an adhesive layer applied to the interior surface of the frame, said adhesive layer being adapted to substantially permanently secure the frame to the wall of the device.

9. A stand for supporting a portable device at an inclined angle relative to a flat surface; said stand comprising:
   a frame having an interior surface and an exterior surface; wherein the interior surface is adapted to be secured to a wall of the device; and
   a support secured to the frame; said support being movable between a collapsed position and an erected position, and the support is disposed substantially parallel to the interior surface of the frame when in the collapsed position, wherein a first portion of the support is disposed at an angle to the interior surface of the frame and extends outwardly beyond the exterior surface thereof when the support is in the erected position, and wherein a second portion of the support remains parallel to the interior surface when the support is in the erected position; and wherein the first and second portions are in linear alignment with each other when the support is in the collapsed position;
   a first hinge securing the first portion of the support to the frame; and
   a second hinge securing the second portion of the support to the first portion thereof, and the first and second hinges are substantially aligned with each other and with the frame when the support is in each of the erected and collapsed positions.

10. The stand as defined in claim 9, wherein the stand is a single injection molded plastic and both of the first and second hinges are living hinges.

11. A stand, for supporting a portable device at an inclined angle relative to a flat surface; said stand comprising:
    a frame having an interior surface and an exterior surface; wherein the interior surface is adapted to be secured to a wall of the device; and
    a support secured to the frame; said support being movable between a collapsed position and an erected position, and the support is disposed substantially parallel to the interior surface of the frame when in the collapsed position, and a first portion of the support is disposed at an angle to the interior surface of the frame and extends outwardly beyond the exterior surface thereof when the support is in the erected position; and a second portion of the support is engaged with the first portion thereof and is in linear alignment with the first portion when the support is in the collapsed position, and the second portion of the support remains aligned with the frame when the support is in the erected position;

a locking mechanism that locks the second portion of the support to the frame in one or both of the collapsed and erected positions; and wherein the locking mechanism comprises:
  at least one first notch defined in one of the frame and the second portion of the support; and
  at least one detent defined in the other of the frame and the second portion of the support; and wherein the at least one detent is engaged in the at least one notch to lock the frame and support to each other.

12. The stand as defined in claim 11, wherein the locking mechanism comprises a pair of aligned first notches defined in one of the frame and the support and a pair of aligned second notches defined in the one of the frame and the support a spaced distance from the first notches; and wherein the stand further comprises a pair of aligned detents defined in the other of the frame and the support; and wherein the pair of detents are selectively engaged in the first pair of notches when the support is in the collapsed position and the pair of detents are engaged in the second pair of notches when the support is in the erected position.

13. The stand as defined in claim 11, wherein the support further includes at least one spring finger that abuts a region of the frame, and wherein the one of the at least one first notch and at least one detent provided on the support are provided on the spring finger, and the other of the at least one first notch and at least one detent provided on the frame are provided on the region of the frame abutted by the spring finger.

14. The stand as defined in claim 13, wherein the support further comprises:
  a second portion; and
  a hinge connecting the second portion of the support to the first portion thereof; and wherein the second portion of the support is longitudinally slidable relative to the frame to move the support between the collapsed and erected positions, and wherein the spring finger extends laterally outwardly from the second portion of the support to abut the frame.

15. A stand for supporting a portable device at an inclined angle relative to a flat surface; said stand comprising:
  a frame having:
    an interior surface adapted to be secured to a wall of the device;
    an exterior surface;
    a first side;
    a second side, where the first and second sides are disposed parallel to each other and spaced a distance from each other;
    a first end and a second end disposed parallel to each other and spaced a distance from each other, where the first and second ends extend between the first and second sides; whereby the frame is substantially rectangular;
  an aperture defined and bounded by the first and second sides and first and second ends;
  a support disposed within the aperture of the frame, said support comprising a first portion and a second portion, wherein the first portion comprises a tab and a first arm;
  a first hinge secures the support tab to the first end of the frame;
  a second hinge secures the tab to a first end of the first arm; and
  a third hinge secures a second end of the first arm to a first end of the second portion; wherein the support is movable between a collapsed position and an erected position, when the support is in the collapsed position, the tab, the first arm and the second portion are in linear alignment with each other within the frame; and when the support is in the erected position, the first portion of the support is disposed at an angle to the interior surface of the frame and extends outwardly beyond the exterior surface thereof; and the second portion of the support is disposed parallel to the frame and a second end of the second portion is detachably engaged with the frame.

16. The stand as defined in claim 15, wherein the second portion is disposed in a first location in the aperture adjacent the second end of the frame when the support is in the collapsed position, and the second portion is disposed in a second location in the aperture a distance away from the second end of the frame when the support is in the erected position, and wherein a second end of the second portion is engaged with the frame when the support is in each of the collapsed and erected positions.

17. The stand as defined in claim 16, wherein all of the tab, the first arm and the second portion are substantially coplanar with each other and are parallel to the interior surface of the frame when the support is in the collapsed position; and, when the support is in the erected position, the second portion is disposed parallel to the interior surface of the frame and the tab and the first arm are each disposed at an angle relative to the second portion.

18. The stand as defined in claim 17, wherein the tab is additionally disposed at an angle relative to the first arm when the support is in the erected position.

19. The stand as defined in claim 16, wherein the tab is substantially T-shaped and includes a base and a leg, where the base is connected by the first hinge to the frame and is connected by the second hinge to the first arm; and wherein the leg is not secured to the first arm and extends beyond the second hinge toward the second portion.

20. The stand as defined in claim 19, wherein the base and leg are integral and are coplanar, and, when the support is in the erected position, the leg is adapted to contact the surface to retain the device at an inclined angle thereto.

21. A stand for supporting a portable device at an inclined angle relative to a flat surface; said stand comprising:
  a frame having an interior surface and an exterior surface; wherein the interior surface is adapted to be secured to a wall of the device;
  a gasket, wherein the gasket has an interior surface and an exterior surface;
  an adhesive layer applied to the interior surface of the frame, said adhesive layer being adapted to substantially permanently secure the frame to the wall of the device, and wherein the adhesive layer applied to the frame is disposed on the exterior surface of the gasket, and wherein the stand further includes:
  a second adhesive layer applied to the interior surface of the gasket, and wherein the second adhesive layer is adapted to substantially permanently secure the gasket between the frame and the wall of the device; and
  a support secured to the frame, said support comprising a first portion and a second portion which are hingedly engaged with each other; said support being movable between a collapsed position and an erected position, and wherein the first and secondportions of the support are disposed in linear alignment with each other and substantially parallel to the interior surface of the frame when the support is in the collapsed position, and when the support is in the erected position, the first portion of the support is disposed at an angle to the interior surface of the frame and extends outwardly beyond the exterior surface thereof and the second portion is disposed parallel to the frame.

22. In combination,
a portable electronic device; and
a stand engageable with the electronic device; wherein the stand is movable between a collapsed position to an erected position and, when in the erected position, the stand is adapted to retain the electronic device at an inclined angle relative to a flat surface and wherein the stand comprises:
a frame having an interior surface and an exterior surface; wherein the interior surface is secured to a wall of the portable electronic device; and
a support secured to the frame and movable between a first and a second position; and wherein the support includes a first portion and a second portion;
a first hinge securing the first portion of the support to the frame;
a second hinge securing the second portion of the support to the first portion thereof; and when the stand is in the erected position the first portion of the support is disposed at an angle to the interior surface of the frame and extends outwardly beyond the exterior surface thereof and the second portion is disposed parallel to the frame, and the first portion and the second portion of the support are disposed substantially parallel to the interior surface of the frame and in linear alignment with each other when the stand is in the collapsed position; and wherein the first and second hinges are substantially aligned with the frame when the support is in each of the erected and collapsed positions.

23. The combination as defined in claim 22, wherein when the stand is in the erected position it is able to retain the electronic device at the inclined angle relative to the flat surface in one of a first orientation and a second orientation.

24. The combination as defined in claim 23, wherein the portable electronic device includes a screen and, when the stand retains the electronic device in the first orientation, the screen is positioned in a portrait mode; and when the stand retains the electronic device in the second orientation, the screen is positioned in a landscape mode.

25. The combination as defined in claim 22, wherein the stand is substantially permanently engaged with the portable electronic device.

26. The combination as defined in claim 22, wherein the stand includes a locking mechanism that is movable between a first position, where the stand is locked in the collapsed position, and a second position where the stand is locked in the erected position.

27. The combination as defined in claim 22, wherein the portable electronic device is a handheld device comprising one of a cell phone, a smart phone, a personal digital assistant, and an electronic book; and wherein the electronic device further includes a screen and configured to display a video image on the screen, and wherein the video image is one of a video, a music video, a feature film, a live stream, a television broadcast, and a digital book.

28. The combination as defined in claim 27, wherein the stand is moved to the collapsed position for transportation and during use of the portable electronic device for purposes other than viewing the video image for an extended length of time, and the stand is moved to the erected position for viewing of the video image for an extended length of time.

29. The combination as defined in claim 22, wherein the stand includes:
a frame that is adhesively secured to the portable electronic device: and
a leg that is movable out of alignment with the frame and is adapted to engage the surface so as to retain the electronic device at the inclined angle to the surface.

30. The combination as defined in claim 22, further comprising a tether, and wherein the tether is adapted to suspend the electronic device from a vertical flat surface so that the screen is retained at a viewable orientation, and wherein the stand further includes a first tether connector and a second tether connector and the tether is selectively engaged with one of the first and second tether connectors.

31. The combination as defined in claim 30, where the first and second tether connectors are disposed at right angles to each other on the stand and, when the tether is engaged with the first tether connector, the screen is retained in a portrait mode orientation, and when the tether is engaged with the second tether connector, the screen is retained in a landscape mode orientation.

32. The combination as defined in claim 31, wherein the stand is positioned in the collapsed position when the tether is engaged in either of the first and second tether connectors.

33. The combination as defined in claim 31, wherein the stand is positioned in the erected position when the tether is engaged in either of the first and second tether connectors.

* * * * *

UNITED STATES PATENT AND TRADEMARK OFFICE
CERTIFICATE OF CORRECTION

PATENT NO. : 8,162,283 B1
APPLICATION NO. : 12/913960
DATED : April 24, 2012
INVENTOR(S) : Miraslav Royz et al.

Page 1 of 1

It is certified that error appears in the above-identified patent and that said Letters Patent is hereby corrected as shown below:

Column 9, line 59 (Claim 15) "a first hinge secures the support tab" should be changed to --a first hinge secures the tab--

Column 9, line 66 (Claim 15) "when the support is" should be changed to --and when the support is--

Column 10, line 59 (Claim 21) "the first and secondportions" should be changed to --the first and second portions--

Signed and Sealed this
Seventeenth Day of July, 2012

David J. Kappos
*Director of the United States Patent and Trademark Office*